(12) United States Patent
Ishii

(10) Patent No.: US 8,285,234 B2
(45) Date of Patent: Oct. 9, 2012

(54) MOBILE STATION APPARATUS

(75) Inventor: Takahito Ishii, Tokyo (JP)

(73) Assignee: Hitachi Kokusai Electric Inc, Tokyo (JP)

( * ) Notice: Subject to any disclaimer, the term of this patent is extended or adjusted under 35 U.S.C. 154(b) by 35 days.

(21) Appl. No.: 13/028,520

(22) Filed: Feb. 16, 2011

(65) Prior Publication Data

US 2011/0263218 A1 Oct. 27, 2011

(30) Foreign Application Priority Data

Apr. 21, 2010 (JP) ............................. P. 2010-097565

(51) Int. Cl.
*H04B 17/02* (2006.01)
*H04B 7/02* (2006.01)

(52) U.S. Cl. .................. 455/135; 455/101; 455/138

(58) Field of Classification Search .................. 455/101, 455/114.2, 115.1, 132, 135, 137, 138, 140, 455/278.1, 296

See application file for complete search history.

(56) References Cited

U.S. PATENT DOCUMENTS

| | | | |
|---|---|---|---|
| 6,070,086 A * | 5/2000 | Dobrica | 455/522 |
| 7,174,178 B2 * | 2/2007 | Bergel | 455/502 |
| 7,248,645 B2 * | 7/2007 | Vialle et al. | 375/299 |
| 7,319,868 B2 * | 1/2008 | Lindoff | 455/422.1 |
| 7,561,850 B2 * | 7/2009 | Hara | 455/69 |
| 7,945,222 B2 * | 5/2011 | Harel et al. | 455/101 |
| 8,054,905 B2 * | 11/2011 | Shnaider et al. | 375/267 |

FOREIGN PATENT DOCUMENTS

| | | |
|---|---|---|
| JP | 2002-118534 | 4/2002 |
| JP | 2005-341277 | 12/2005 |
| JP | 2007-104505 | 4/2007 |
| JP | 2008-124643 | 5/2008 |
| JP | 2010-016836 | 1/2010 |

* cited by examiner

*Primary Examiner* — Sonny Trinh
(74) *Attorney, Agent, or Firm* — Jacobson Holman PLLC (57) ABSTRACT

A mobile station apparatus is provided which is capable of obtaining a diversity effect and preventing an increase in noise even if an antenna phase difference containing an error is detected. The mobile station apparatus includes a closed-loop transmit diversity control section for exerting, when the quality of the component from the second antenna is lower than a predetermined quality value based on the quality measured by the common pilot channel quality measurement section, control to cause the feedback information generation section not to use the detection result at the antenna phase difference detection section, and to continue to use the immediately preceding feedback information, control to cause the antenna verification section not to operate, and control to cause the first channel inference section to operate and the second channel inference section not to operate.

8 Claims, 4 Drawing Sheets

FIG.2

| FUNCTION SECTION / STATE | FBI BIT GENERATION SECTION | ANTENNA VERIFICATION SECTION | CHANNEL INFERENCE SECTION |
|---|---|---|---|
| Ant 1 : GOOD QUALITY<br>Ant 2 : GOOD QUALITY | ANTENNA PHASE DIFFERENCE DETECTION RESULT IS USED | NORMAL OPERATION | Ant 1 TURN ON<br>Ant 2 TURN ON |
| Ant 1 : GOOD QUALITY<br>Ant 2 : BAD QUALITY | ANTENNA PHASE DIFFERENCE DETECTION RESULT IS NOT USED (CONTINUE TO USE IMMEDIATELY PRECEDING FBI) | NOT OPERATE | Ant 1 TURN ON<br>Ant 2 TURN OFF |
| Ant 1 : BAD QUALITY<br>Ant 2 : GOOD QUALITY | ANTENNA PHASE DIFFERENCE DETECTION RESULT IS NOT USED (FIXED PATTERN "00") | SINPLIFIED OPERATION FBI "00", SIMILAR OPERATION TO THAT ON BTS SIDE WITH NO ERROR | Ant 1 TURN OFF<br>Ant 2 TURN ON |

MOBILE STATION APPARATUS

This application has a priority of Japanese no. 2010-097565 filed Apr. 21, 2010, hereby incorporated by reference.

BACKGROUND OF THE INVENTION

1. Field of the Invention

The present invention relates to a wireless communication system that performs closed-loop transmit diversity, and more specifically, relates to a mobile station apparatus that receives a closed-loop transmit diversity signal applied to individual communication channels.

2. Description of the Related Art

[Background Art]

Diversity techniques are effective in mobile communication as a technique for reducing the degradation of transmission quality in a fading environment, and one of the diversity techniques is transmit diversity.

In the transmit diversity, a base station apparatus transmits signals from a plurality of antennas, and a mobile station apparatus uses one antenna and a receiving circuit to receive transmitted signals from the base station apparatus.

When the transmit diversity is performed, the base station apparatus has to grasp the status of a downlink transmission line to the mobile station apparatus prior to signal transmission. A technique whereby feedback information from the mobile station apparatus is used to grasp the status of a transmission line is hereinafter referred to as "closed-loop transmit diversity".

For example, even 3GPP, which is the standard of a W-CDMA (Wide Band-Code Division Multiple Access) communication system, adopts closed-loop transmit diversity. The transmit diversity is performed by two transmission antennas (hereinafter referred to as "first antenna" and "second antenna") included in the base station apparatus.

The mobile station apparatus transmits to the base station apparatus, feedback information for controlling a phase of a transmission carrier from the second antenna so as to increase received power of signals received from the base station apparatus. A phase offset applied to the transmission carrier from the second antenna is selected from four phases.

[Related Art]

Related art includes JP-A-2005-341277, "RADIO COMMUNICATION TERMINAL DEVICE AND METHOD FOR CORRECTING TRANSMISSION LINE ESTIMATE OF RADIO COMMUNICATION TERMINAL DEVICE" (MITSUBISHI ELECTRIC CORP).

JP-A-2005-341277 discloses that in a wireless communication terminal device, a feedback information generating section generates feedback information from a transmission line estimate value, an antenna weight estimating section estimates an antenna weight of a radio base station, a synchronous state determination section determines the uplink synchronous state of a transmission line from the feedback information and the result of antenna weight estimation, a phase correction amount determining section determines a phase rotation amount as a correction amount of the transmission line estimate value from the feedback information, the result of antenna weight estimation and the uplink synchronous state, and a transmission line estimate correcting section corrects the transmission estimate value in accordance with the phase rotation amount.

In addition, related art further includes JP-A-2002-118534, "Transmitter/Receiver and Method for Estimating Channel" (SONY INT EUROPE GMBH), JP-A-2008-124643, "Mobile Communication Terminal and Determination Method of Control Volume of Its Phase" (NEC CORP), and JP-A-2010-16836, "Wireless Communication System, Base Station Apparatus, Mobile Station Apparatus and Transmission Control Method" (SHARP KK).

SUMMARY OF THE INVENTION

However, while a conventional mobile station apparatus assumes that an antenna phase difference is properly detected, and the result thereof is properly developed as feedback information on the side of the base station apparatus, in an actual propagation environment, sometimes the level of the first antenna component is significantly reduced or the level of the second antenna component is significantly reduced, although the reception level is suitable.

In this case, the accuracy of antenna phase difference detection degrades, and in addition, the result of the phase difference detection contains a substantial error. When feedback information based on the result of the phase difference detection containing a substantial error is transmitted to the base station, and the base station applies the weight of DPCH2, there is the problem that no diversity effect is obtained, and noise rather increases.

The present invention has been made in view of the circumstances described above, and it is an object of the present invention to provide a mobile station apparatus capable of obtaining a diversity effect and preventing an increase in noise even if an antenna phase difference containing an error is detected.

The present invention solving the problem of the conventional example provides a mobile station apparatus that communicates with a base station apparatus and receives a closed-loop transmit diversity signal by a first antenna and a second antenna of the base station apparatus, including a wireless section for performing band conversion between a radio frequency band signal and a baseband signal of the signal communicated to and from the base station apparatus; a pass detection section for detecting a pass location of the signal from the base station apparatus; a common pilot channel despreading section for despreading a common pilot channel transmitted from the base station apparatus; a dedicated physical channel despreading section for despreading a dedicated physical channel transmitted from the base station apparatus; a common pilot channel quality measurement section for measuring at each component transmitted from the two transmitting antennas in regard to the common pilot channel, the quality of the component; an antenna phase difference detection section for detecting a phase difference in the components transmitted from the two transmitting antennas in regard to the common pilot channel; a feedback information generation section for generating, based on the phase difference, feedback information instructing the base station apparatus on a phase rotation of the signal component from the second antenna on the dedicated physical channel; an antenna verification section for determining a weight vector added to the signal of the dedicated physical channel transmitted from the second antenna according to the feedback information; a first channel inference section for inferring the channel of the signal transmission line for a component from the first antenna; a second channel inference section for inferring the channel of the signal transmission line for a component from the second antenna; a first channel compensation section for performing channel compensation for the dedicated physical channel using the result of the channel inference for the component from the first antenna; a second channel compensation section for performing channel compensation for the dedicated physical channel using the result of the channel inference for the component from the second antenna; a first RAKE synthesis section for performing a RAKE synthesis on the signal resulting from the channel compensation by the first channel compensation section; a second RAKE synthesis section for performing a RAKE synthesis on the signal resulting from the channel compensation by the second channel compensation section; an antenna combination section for combining the output from the first RAKE synthesis section and the output from the second RAKE synthesis section; and a closed-loop transmit diversity control section for exerting, when the quality of the component from the second antenna is lower than a predetermined quality value based on the quality measured by the common pilot channel quality measurement section, control to cause the feedback information generation section not to use the detection result at the antenna phase difference detection section, and to continue to use the immediately preceding feedback information, control to cause the antenna verification section not to operate, and control to cause the first channel inference section to operate and the second channel inference section not to operate. Therefore, a component from an antenna on the side determined to be of bad quality is not contributing to the combination, thus there is an effect that a diversity effect can be obtained and an increase in noise can be prevented even if an antenna phase difference containing an error is detected.

DESCRIPTION OF REFERENCE NUMERALS 101 wireless section
102 path detection section
103 CPICH despreading section
104 DPCH despreading section
105 CPICH quality measurement section
106 antenna phase difference detection section
107 FBI bit generation section
108 antenna verification section
109 CLTD control section
110 first channel inference section
111 second channel inference section
112 first channel compensation section
113 second channel compensation section
114 first RAKE synthesis section
115 second RAKE synthesis section
116 antenna combination section
401 wireless section
402 path detection section
403 CPICH despreading section
404 DPCH despreading section
405 antenna phase difference detection section
406 FBI bit generation section
407 antenna verification section
408 first channel inference section
409 second channel inference section
410 first channel compensation section
411 second channel compensation section
412 first RAKE synthesis section
413 second RAKE synthesis section
414 antenna combination section

DESCRIPTION OF THE PREFERRED EMBODIMENT

An embodiment of the present invention will be described with reference to the drawings.

[Summary of Embodiment]

According to a mobile station apparatus that receives a closed-loop transmit diversity signal according to an embodiment of the present invention, regarding a common pilot channel transmitted from the base station apparatus, at each component transmitted from two transmitting antennas of the base station apparatus, the quality of the component is measured, and based on the measurement result, channel compensation is performed with the channel inference vector of the antenna component on the side determined to be of bad quality set as the null vector so as not to allow contribution to the combination, therefore a superposition of noise components is prevented, in addition, among the two transmitting antennas of the base station, when the quality of the second antenna component is determined to be bad, the antenna phase information detected at the mobile station is not used, the immediately preceding feedback information transmitted to the base station continues to be used and the verification processing is not performed, and when the quality of the first antenna component is determined to be bad, feedback information is generated with a specific fixed pattern, and an antenna verification unit is operated assuming that weight control with no error is also exerted on the base station apparatus side with a specific fixed pattern. Therefore, there is an effect that a diversity effect can be obtained and an increase in noise can be prevented even if an antenna phase difference containing an error is detected. In addition, there is another effect that the processing can be simplified.

Figure 1:
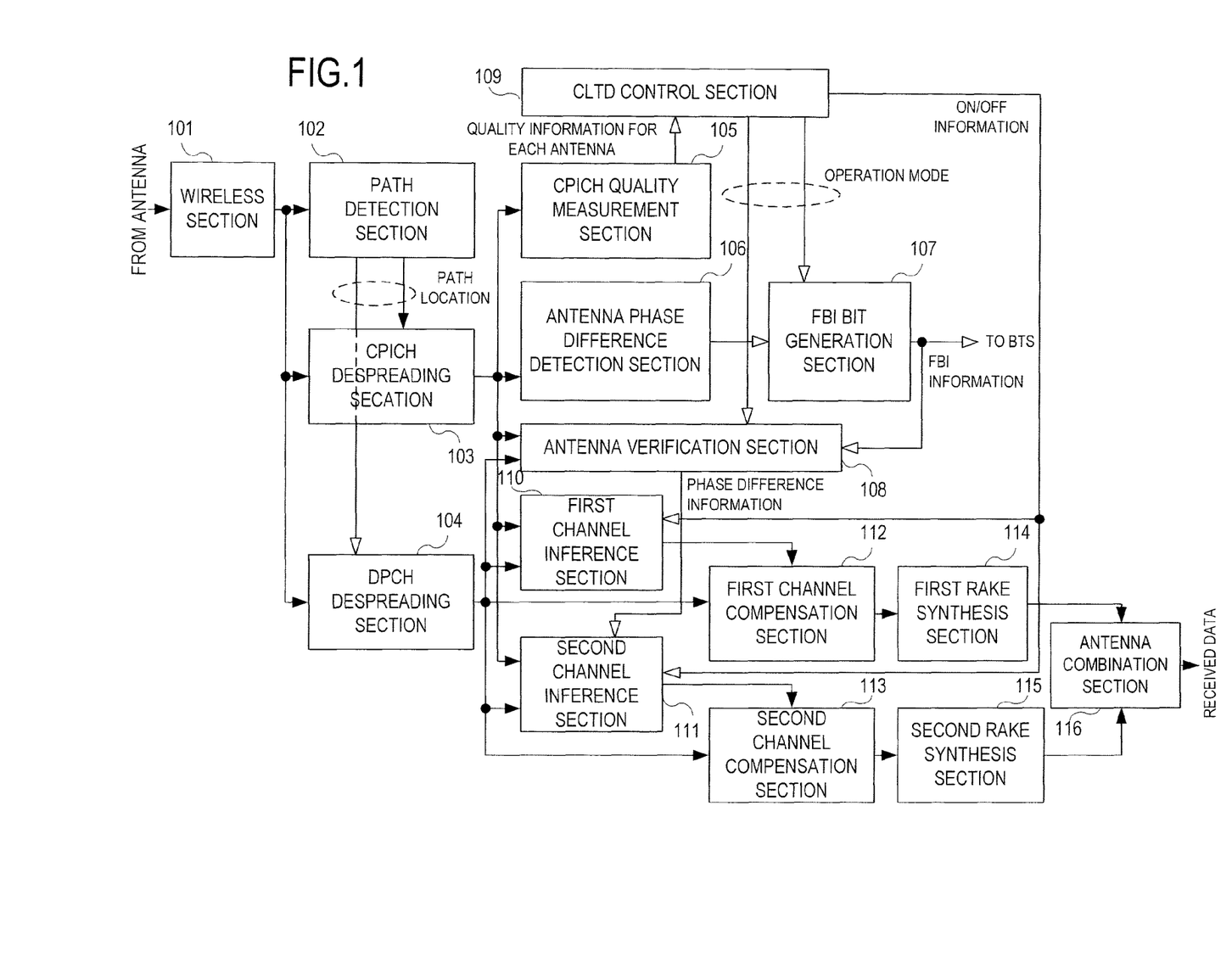
FIG. 1 is a configuration block diagram of a mobile station apparatus according to an embodiment of the present invention.

[Mobile Station Apparatus: FIG. 1]

A mobile station apparatus that receives a closed-loop transmit diversity signal according to an embodiment of the present invention will be described with reference to FIG. 1. FIG. 1 is a configuration block diagram of a mobile station apparatus according to an embodiment of the present invention.

As shown in FIG. 1, the mobile station apparatus according to the embodiment of the present invention (the apparatus) basically includes a wireless section 101, a path detection section 102, a CPICH despreading section 103, a DPCH despreading section 104, a CPICH quality measurement section 105, an antenna phase difference detection section 106, an FBI bit generation section 107, an antenna verification section 108, a CLTD control section 109, a first channel inference section 110, a second channel inference section 111, a first channel compensation section 112, a second channel compensation section 113, a first RAKE synthesis section 114, a second RAKE synthesis section 115, and an antenna combination section 116.

[Each Section of Mobile Station Apparatus]

Each section of the apparatus will be specifically described.

The wireless section 101 performs band conversion between a radio frequency band signal and a baseband signal of the signal communicated between the base station apparatus and the mobile station apparatus.

The pass detection section 102 detects a pass location of the signal from the base station apparatus.

The CPICH despreading section 103 despreads the common pilot channel (CPICH) transmitted from the base station apparatus at the location of the pass detected in the path detection section 102.

The DPCH despreading section 104 despreads the dedicated communication channel (DPCH: dedicated physical channel) transmitted from the base station apparatus to the mobile station at the location of the pass detected in the path detection section 102.

The CPICH quality measurement section 105 measures at each component transmitted from two transmitting antennas of the base station apparatus (first antenna [primary antenna] and second antenna [secondary antenna]) in regard to the common pilot channel transmitted from the base station apparatus, the quality of the component.

The antenna phase difference detection section 106 detects a phase difference in the components transmitted from the first antenna and the second antenna in regard to the common pilot channel transmitted from the base station apparatus.

The feedback information generation section 107 generates, based on the phase difference, feedback information (FBI bit) instructing the base station apparatus on a phase rotation of the signal component (DPCH2) from the second antenna on DPCH.

Taking the W-CDMA system as an example, FBI bits include one bit per one slot of an uplink signal; whether the phase offset $\phi$ is 0 or $\pi$ is determined for an even-number slot, and FBI (even-number slot)=0 if the determination is $\phi$=0, while FBI (even-number slot)=1 if the determination is $\phi$=$\pi$.

Meanwhile, whether the phase offset $\phi$ is $\pi/2$ or $-\pi/2$ is determined for an odd-number slot, and FBI (odd-number slot) =0 if the determination is $\phi$=$\pi/2$, while FBI (odd-number slot) =1 if the determination is $\phi$=$-\pi/2$.

The antenna verification section 108 determines, at the base station apparatus, a weight vector (phase offset) added to the signal of DPCH2 according to the feedback information from the mobile station apparatus.

For example, the following approach may be used for phase offset determination.

The patterns that may be taken by an even-number slot and an odd-number slot of the FBI bits and the phase candidates can be combined in the following four ways:

(0, 0): $\pi/4$ radians
(0, 1): $-\pi/4$ radians
(1, 0): $3\pi/4$ radians
(1, 1): $-3\pi/4$ radians Since the downlink DPCH2 and downlink CPICH2 transmitted from the second antenna arrive at the mobile station apparatus through the identical transmission line, the amounts of phase variation caused by fading is the same for DPCH2 and CPICH2. The phase of DPCH2 is further rotated by the phase offset.

Therefore, when a complex vector representing the effect of the fading is $\theta$, and the received DPCH2 and received CPICH2, which have been affected by the fading, are represented respectively by $\theta^*(DPCH2)$ and $\theta^*(CPICH2)$, if $\theta^*(CPICH2)$ is rotated by the phase offset added to DPCH2 at the base station apparatus, it has the same phase as $\theta^*(DPCH2)$, ideally.

This property is used at the antenna verification section 108 to determine complex vectors $\Gamma1$ to $\Gamma4$ resulting from the rotations of $\theta^*(CPICH2)$ by the four phase rotations that may be taken by the FBI combinations ($\pi/4$ radians, $-\pi/4$ radians, $3\pi/4$ radians and $-3\pi/4$ radians), and depending on which from among these vectors has a phase that is close to the phase of $\theta^*(DPCH2)$, the phase offset applied by the base station is determined.

The phase of $\theta^*(DPCH2)$ can be found using a dedicated pilot symbol subjected to time-division multiplexing with DPCH2 on the transmission side, and having a known symbol pattern. Which from among $\Gamma1$ to $\Gamma4$ has a phase that is close to the phase of $\Gamma^*(DPCH2)$ can be determined by correlating $\theta^*(DPCH2)$ with each of $\Gamma1$ to $\Gamma4$; this is possible, for example, by calculating inner products for the vectors.

The phase difference determined to be the closest from among $\Gamma1$ to $\Gamma4$ is compared to the phase difference based on the FBI bits actually transmitted to the base station, and if they are different, an FBI bit transmission history is updated. If there is a difference, the reason could be, for example, that an error occurs in the FBI bits of an uplink signal upon reception at the base station; however, degradation due to an error occurring on the base station apparatus side can be reduced by antenna verification processing.

The CLTD (Closed Loop Transmit Diversity) control section 109 exerts control on a closed-loop transmit diversity receiving method such as a feedback information generation method, an antenna verification method, and a channel inference method, which is described later, based on the quality of each component transmitted from the first and second antennas of the base station apparatus, which is measured at the CPICH quality measurement section 105.

The concrete operation of the CLTD control section 109 will be described later.

The first channel inference section 110 and the second channel inference section 111 infer the channel of the transmission line for a signal from the base station apparatus at each of the first antenna and second antenna components.

The first channel compensation section 112 and the second channel compensation section 113 use the results of the channel inference at each of the first antenna and second antenna components to perform DPCH channel compensation for the respective antenna components.

The first RAKE synthesis section 114 and the second RAKE synthesis section 115 perform a RAKE synthesis on the signals resulting from the channel compensation for each path at each of the first antenna and second antenna components.

The antenna combination section 116 combines the first antenna component and the second antenna component.

[Operation of the Apparatus]

Next, a method of receiving a closed-loop transmit diversity signal according to the present invention will be described.

At the wireless section 101, frequency conversion and quadrature detection are performed to yield in-phase component and quadrature component signals, which are converted into digital signals, and then sent out to the path detection section 102, the CPICH despreading section 103 and the DPCH despreading section 104.

At the path detection section 102, a correlation with the spread signal applied to the downlink signal of the base station apparatus is taken to perform path detection.

At the location of the path detected in the path detection section 102, despreading is performed with the CPICH despreading section 103 using the same spreading code as that applied to the CPICH signal in the base station apparatus, and despreading is performed with the DPCH despreading section 104 using the same spreading code as that applied to the DPCH signal in the base station apparatus.

The antenna phase difference detection section 106 detects a phase difference between the phase of the received signal of CPICH transmitted from the first antenna (CPICH1) and the phase of the received signal of CPICH transmitted from the second antenna (CPICH2) of the base station apparatus. The above is an operation that is similar to prior art.

The CPICH quality measurement section 105 measures the quality of CPICH1 and the quality of CPICH2, each independently, and outputs the result to the CLTD control section 109.

Figure 2:
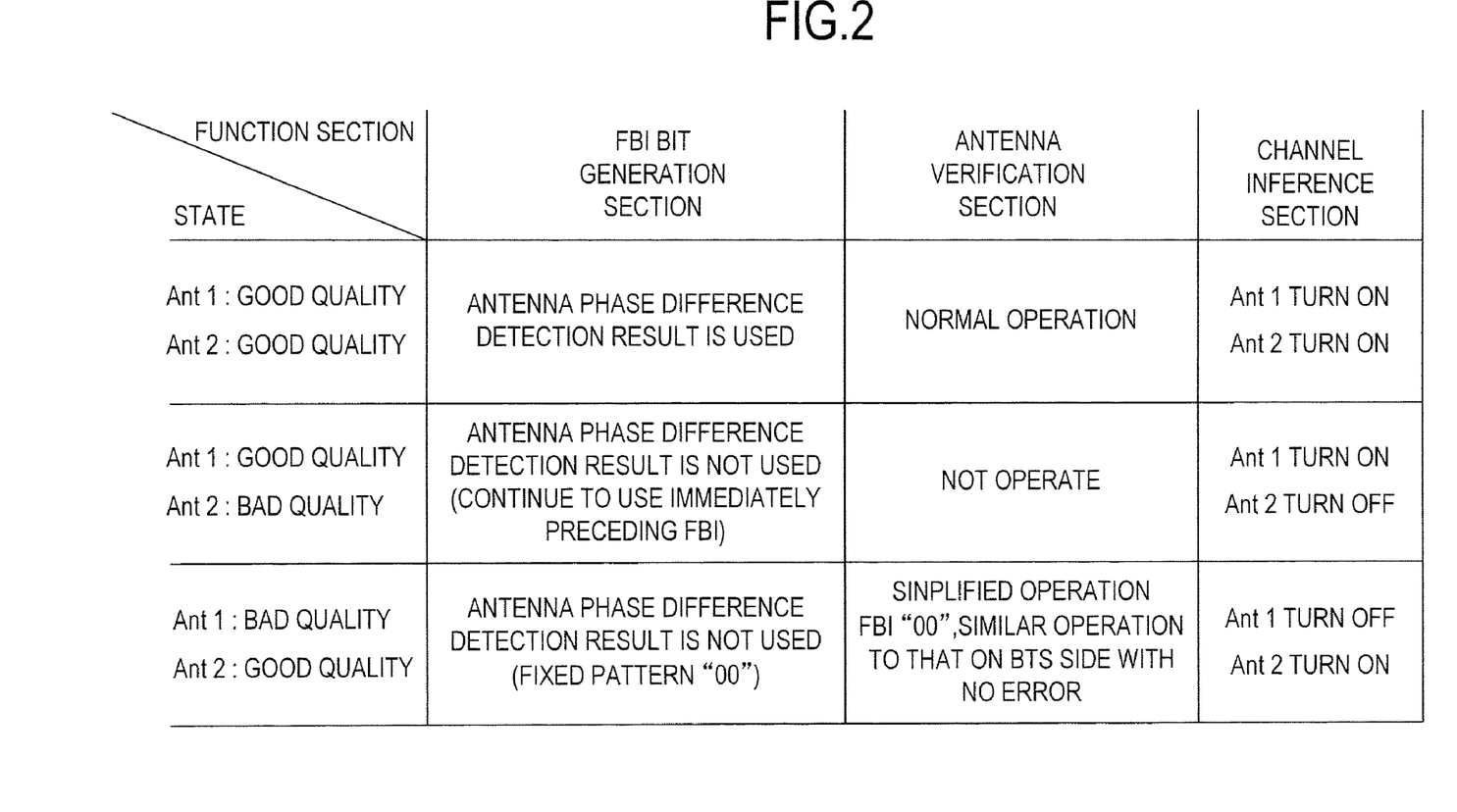
FIG. 2 is a diagram illustrating a control matrix of a CLTD control section.

[Operation of CLTD Control Section 109: FIG. 2]

The operation of the CLTD control section 109 will now be described with reference to FIG. 2. FIG. 2 is a diagram illustrating a control matrix of a CLTD control section.

The CLTD control section 109 determines the operation of the FBI bit generation section 107, the antenna verification section 108, the first channel inference section 110 and the second channel inference section 111 depending on the quality of CPICH for each antenna, which is the result of the measurement by the CPICH quality measurement section 105.

As shown in FIG. 2, as a first state, if the qualities of CPICH1 from the first antenna (Ant1) and CPICH2 from the second antenna (Ant2) are both good, the FBI bit generation section 107 uses the result of the antenna phase difference detection by the antenna phase difference detection section 106, the antenna verification section 108 performs a normal operation, and the first channel inference section 110 and the second channel inference section 111 both enable (turn on) the channel inference vector.

Further, as a second state, if the quality of CPICH1 from the first antenna (Ant1) is good, and the quality of CPICH2 from the second antenna (Ant2) is bad, the FBI bit generation section 107 does not use the result of the antenna phase difference detection by the antenna phase difference detection section 106, and continues to use the immediately preceding FBI bit, the antenna verification section 108 does not operate, the first channel inference section 110 enables (turns on) the channel inference vector, and the second channel inference section 111 disables (turns off) the channel inference vector.

That is to say, on/off control is exerted on the operation of the first channel inference section 110 and the second channel inference section 111 in such a way that, if the quality of CPICH2 is bad, the channel inference vector on the second antenna side is disabled (null vector), and has no contribution to the antenna combination after channel compensation.

Moreover, as a third state, if the quality of CPICH1 from the first antenna (Ant1) is bad, and the quality of CPICH2 from the second antenna (Ant2) is good, the FBI bit generation section 107 does not use the result of the antenna phase difference detection by the antenna phase difference detection section 106, and uses the fixed pattern "00", the antenna verification section 108 performs a simplified operation, the first channel inference section 110 disables (turns off) the channel inference vector, and the second channel inference section 111 enables (turns on) the channel inference vector.

The simplified operation selects the phase difference corresponding to the fixed pattern "00", and outputs phase difference information.

More specifically, this is for adjusting the second antenna with the FBI bits set to the fixed pattern "00", and for performing similar operations to the weight control exerted on the BTS (Base Transceiver Station) side with no error.

That is to say, on/off control is exerted on the operation of the first channel inference section 110 and the second channel inference section 111 in such a way that, if the quality of CPICH1 is bad, the channel inference vector on the first antenna side is disabled (null vector), and has no contribution to the antenna combination after channel compensation.

In the second and third states, by preventing the antenna component of the side having bad quality from contributing to the combination, the effect of preventing a superposition of noise components can be expected.

That is to say, the FBI bit generation section 107 is instructed, as an operation mode, to not use the result of the antenna phase difference detection section 106 and to adopt a specific fixed pattern, if the quality of CPICH1 is bad.

Conversely, if the quality of CPICH2 is bad, the FBI bit generation section 107 is instructed, as an operation mode, to not use the result of the antenna phase difference detection section 106 and to continue to use the immediately preceding FBI bit.

This allows for the expectation that, when the accuracy of the phase difference detection is degraded, invalid weight control on the second antenna side of the base station apparatus due to the uncertainty of the transmitted FBI bits is prevented.

Then, the antenna verification section 108 is instructed, an operation mode, to turn the antenna verification operation into a simplified operation, if the quality of CPICH1 is bad. Conversely, the antenna verification section 108 is instructed, as an operation mode, not to perform verification processing, if the quality of CPICH2 is bad.

Figure 3:
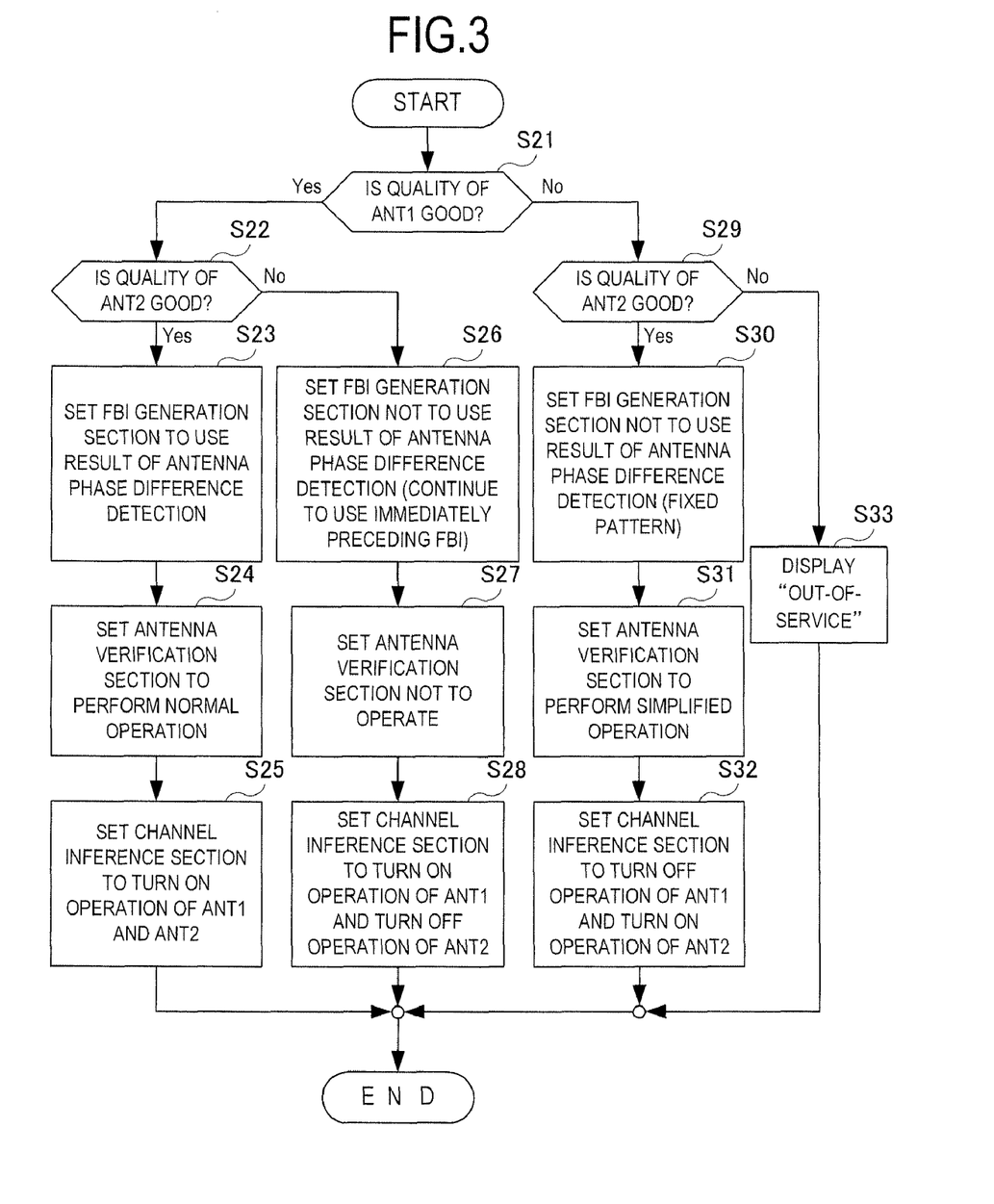
FIG. 3 is a control flow chart of the CLTD control section.

[Processing Flow of CLTD Control Section 109: FIG. 3]

The processing flow of the CLTD control section 109 will be described with reference to FIG. 3. FIG. 3 is a control flow chart of the CLTD control section.

As shown in FIG. 3, good or bad is determined by the CLTD control section 109 according to the quality of CPICH1 from the first antenna (Ant1), which is a result of measurements by the CPICH quality measurement section 105 (S21). The concrete processing of the determination will be described later.

If the quality of CPICH1 from Ant 1 is good (Yes), good or bad is then determined for the quality of CPICH2 from the second antenna (Ant2) (S22).

If the quality of CPICH2 from Ant2 is good (Yes), the CLTD control section 109 sets the FBI bit generation section 107 to use the result of the antenna phase difference detection (S23).

Subsequently, the CLTD control section 109 sets the antenna verification section 108 to perform a normal operation (S24).

Further, the CLTD control section 109 sets the first channel inference section 110 and the second channel inference section 111 to enable the channel inference vector (turn on the operation of the antennas 1 and 2) (S25), and terminates the processing.

On the other hand, if the quality of CPICH2 from Ant2 is not good (No) in determination processing S22, the CLTD control section 109 sets the FBI bit generation section 107 not to use the result of the antenna phase difference detection, and to continue to use the immediately preceding FBI bits (S26).

Subsequently, the CLTD control section 109 sets the antenna verification section 108 not to operate (S27), the first channel inference section 110 to enable the channel inference vector (turn on the operation of the antenna 1), and the second channel inference section 111 to disable the channel inference vector (turn off the operation of the antenna 2) (S28), and terminates the processing.

Here, turning off the antenna operation means that the channel inference vector becomes the null vector.

On the other hand, if the quality of CPICH1 from Ant 1 is not good (No) in determination processing S21, good or bad is then determined for the quality of CPICH2 from the second antenna (Ant2) (S29). If the quality of CPICH2 from Ant2 is good (Yes) in determination processing S29, the CLTD control section 109 sets the FBI bit generation section 107 not to use the result of the antenna phase difference detection, and to use the fixed pattern (fixed pattern "00") (S30). Although the fixed pattern here is "00", the fixed pattern may be "11".

Subsequently, the CLTD control section 109 sets the antenna verification section 108 to perform a simplified operation (operation that adjusts the second antenna based on the fixed pattern "00") (S31), the first channel inference section 110 to disable the channel inference vector (turn off the operation of the antenna 1), and the second channel inference section 111 to enable the channel inference vector (turn on the operation of the antenna 2) (S32), and terminates the processing.

On the other hand, if the quality of CPICH2 from Ant2 is not good (No) in determination processing S29, the CLTD control section 109 sets a display section to display "out-of-service" (S33).

Figure 4:
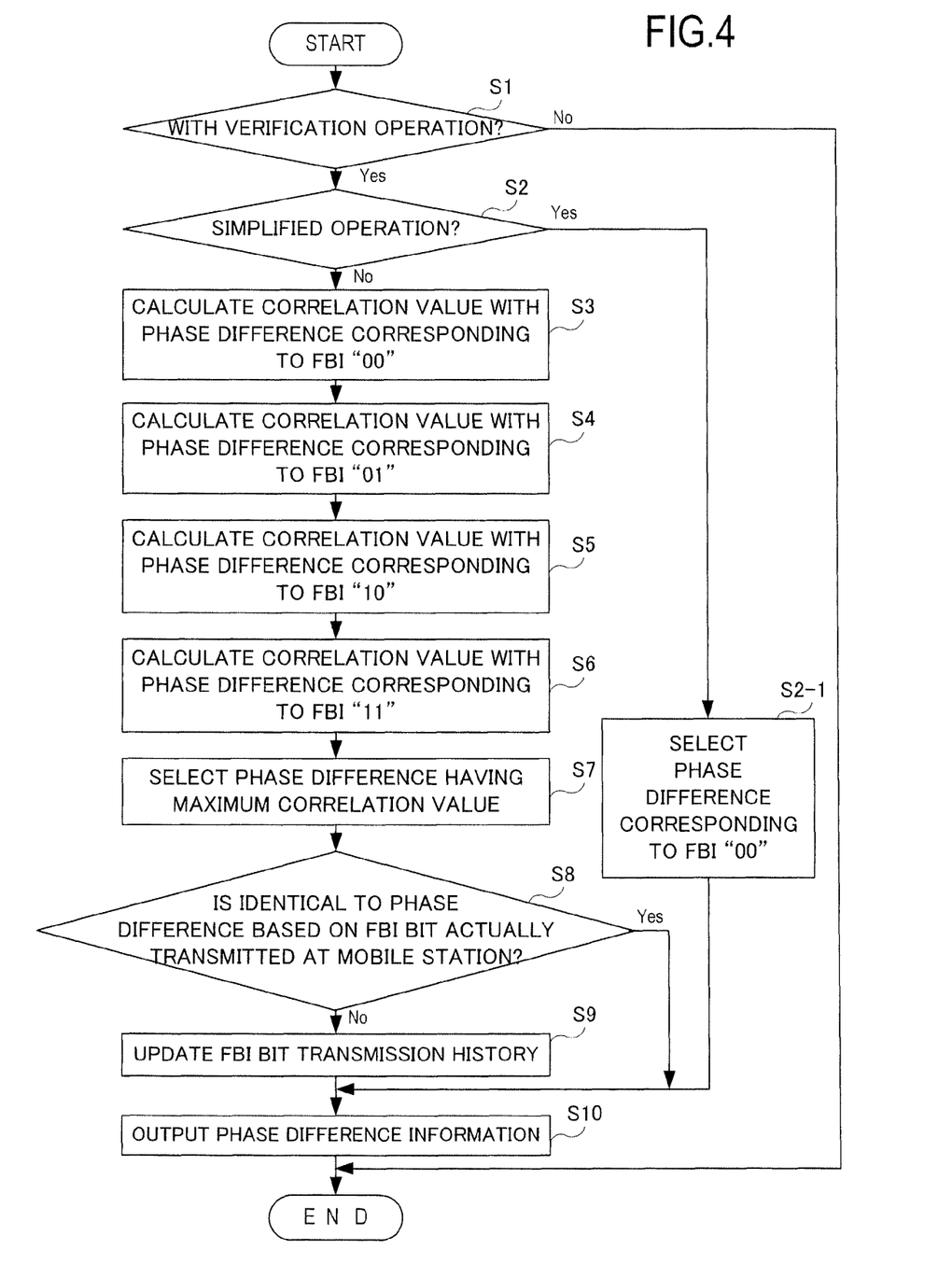
FIG. 4 is an operational flow chart of an antenna verification section.

[Operation of Antenna Verification Section: FIG. 4]

The operation flow of the antenna verification section 108 will now be described in detail with reference to FIG. 4. FIG. 4 is an operational flowchart of the antenna verification section.

The antenna verification section 108 first verifies whether the setting instruction from the CLTD control section 109 is set to "with antenna verification".

First, the antenna verification section 108 determines whether the setting instruction is set to "with antenna verification" (S1).

If set to "without verification operation" (No) in determination processing S1, the phase difference information is not output, and the processing is terminated.

On the other hand, if set to "with verification operation" (Yes), whether a simplified operation is to be specified or a normal operation is to be specified is determined (S2).

If a simplified operation is specified (Yes) in determination processing S2, since the FBI bit generation section 107 transmits a specific fixed pattern to the base station (for example, fixed pattern "00" in FIG. 2), a phase difference corresponding to the specific fixed pattern is selected to output the phase difference information (S2-1).

If a normal operation is specified (No) in determination processing S2, complex vectors $\Gamma1$ to $\Gamma4$ are calculated for four types of phase difference candidates.

More specifically, the correlation value is calculated for $\Gamma1$ with the phase difference corresponding to the FBI "00" pattern (S3), the correlation value is calculated for $\Gamma2$ with the phase difference corresponding to the FBI "01" pattern (S4), the correlation value is calculated for $\Gamma3$ with the phase difference corresponding to the FBI "10" pattern (S5), and the correlation value is calculated for $\Gamma4$ with the phase difference corresponding to the FBI "11" pattern (S6).

Then, the one having the maximum correlation is selected from among $\Gamma1$ to $\Gamma4$ (S7).

Next, the phase difference determined to be the closest from among $\Gamma1$ to $\Gamma4$ and the phase difference based on the FBI bits actually transmitted to the base station are compared, and whether the two phase differences are identical is determined (S8).

If identical (Yes), the processing proceeds to S10. If different (No), the FBI bit transmission history is updated (S9), the phase difference information is output to the second channel inference section 111 (S10), and the processing is terminated.

In this way, if the quality of the second antenna is degraded, and no effect from the antenna verification can be expected substantially, a reduction of this processing can be anticipated, and in a case where the quality of the first antenna is degraded and the phase difference cannot be detected properly, a reduction of the propagation of verification error and a simplification of the verification processing itself can be anticipated, owing to the generation method and fusion of feedback information.

In regard to measuring independently the respective quality of CPICH1 and CPICH2 and determining whether the quality resulting from the measurement is good or bad, performance is possible by a method in which, with a predetermined value as a threshold, a quality of CPICH1 or CPICH2 that is equal to or higher than the threshold is determined to be "good", and "bad" if lower than the threshold, alternatively, if the difference between the quality of CPICH1 and the quality of CPICH2 is equal to or higher than a predetermined value, the quality of the antenna component which is lower is determined to be "bad".

The phase difference information, which was determined and sent out as described above, is entered into the second channel inference section 111, and in the second channel inference section 111, a channel inference value is determined by taking into account the phase difference information and by taking into account the on/off information from the CLTD control section 109. On the other hand, also in the first channel inference section 110, a channel inference value is determined by taking into account the on/off information from the CLTD control section 109.

The first channel compensation section 112 multiplies a complex conjugate of the inferred value calculated by the first channel inference section 110 by a data symbol of a received DPCH output by the DPCH despreading section 104, thereby compensating for a phase fluctuation caused by fading for the first antenna component.

The second channel compensation section 113 multiplies a complex conjugate of the inferred value calculated by the second channel inference section 111 by a data symbol of a received DPCH output by the DPCH despreading section 104, thereby compensating for a phase fluctuation caused by fading for the second antenna component, as well as compensating for an antenna phase offset.

The first RAKE synthesis section 114 performs an RAKE synthesis of a multipath component which phase fluctuation is compensated by the first channel compensation section 112. Similarly, the second RAKE synthesis section 115 performs an RAKE synthesis of a multipath component which phase fluctuation is compensated by the second channel compensation section 113. For the outputs from the first RAKE synthesis section 114 and the second RAKE synthesis section 115, two antenna components are combined by the antenna combination section 116 to obtain received data.

[Advantage of Embodiment]

According to the apparatus, operational problems of a mobile station apparatus in prior art are solved by the mobile station apparatus and closed-loop transmit diversity receiving method described above, regarding a common pilot channel transmitted from the base station apparatus, at each component transmitted from two transmitting antennas of the base station apparatus, the quality of the component is measured, and based on the measurement result, channel compensation is performed with the channel inference vector of the antenna component on the side determined to be of bad quality set as the null vector so as not to allow contribution to the combination, therefore a superposition of noise components is prevented, among the two transmitting antennas of the base station, when the quality of the secondary antenna component is determined to be bad, the antenna phase information detected at the mobile station is not used, the immediately preceding feedback information transmitted to the base station continues to be used and the verification processing is not performed, and when the quality of the primary antenna component is determined to be bad, feedback information is generated with a specific fixed pattern, and the antenna verification section 108 is operated assuming that weight control with no error is also exerted on the base station apparatus side with a specific fixed pattern. Therefore, there is an effect that a diversity effect can be obtained and an increase in noise can be prevented even if an antenna phase difference containing an error is detected. In addition, there is another effect that the processing can be simplified.

[Note]

The present invention provides a mobile station apparatus wherein a closed-loop transmit diversity control section exerts, when the quality of the component from the second antenna is lower than a predetermined quality value based on the quality measured by the common pilot channel quality measurement section, control to cause the feedback information generation section not to use the detection result at the antenna phase difference detection section, and to continue to use the immediately preceding feedback information, control to cause the antenna verification section not to operate, and control to cause the first channel inference section to operate and the second channel inference section not to operate. Therefore, a component from an antenna on the side determined to be of bad quality is not contributing to the combination, thus there is an effect that a diversity effect can be obtained and an increase in noise can be prevented even if an antenna phase difference containing an error is detected.

In addition, preferably, the present invention provides the mobile station apparatus wherein the closed-loop transmit diversity control section exerts, when the quality of the component from the first antenna is lower than a predetermined quality value, control to cause the feedback information generation section to use a specific fixed pattern feedback information, the detection result at the antenna phase difference detection section being unused, control to cause the antenna verification section to perform a simplified operation based on the specific fixed pattern feedback information, and control to cause the first channel inference section not to operate and the second channel inference section to operate. Therefore, a component from an antenna on the side determined to be of bad quality is not contributing to the combination, thus there is an effect that a diversity effect can be obtained and an increase in noise can be prevented even if an antenna phase difference containing an error is detected.

Further, preferably, the present invention provides the mobile station apparatus wherein the antenna verification section operates in the simplified operation assuming that weight control with no error is also exerted on the base station apparatus side with a specific fixed pattern. Therefore, there is an effect that a diversity effect can be obtained and an increase in noise can be prevented even if an antenna phase difference containing an error is detected.

Moreover, preferably, the present invention provides the mobile station apparatus wherein the common pilot channel quality measurement section measures the quality of the first antenna component and the quality of the second antenna component, each independently, and regarding the determination of whether the quality as a result of the measurement is good or bad, a predetermined value serves as a threshold value, the quality being determined to be "good" when equal to or higher than the threshold, and the quality being determined to be "bad" when lower than the threshold.

Furthermore, preferably, the present invention provides the mobile station apparatus wherein the common pilot channel quality measurement section measures the quality of the first antenna component and the quality of the second antenna component, each independently, and regarding the determination of whether the quality as a result of the measurement is good or bad, if the difference between the quality of the first antenna component and the quality of the second antenna component is equal to or greater than a predetermined value, the antenna component with the lower quality is determined to be "bad".

In addition, preferably, the present invention provides the mobile station apparatus wherein the first channel compensation section multiplies a complex conjugate of the inferred value calculated by the first channel inference section by a data symbol of a received common pilot channel output by the common pilot channel despreading section, thereby compensating for a phase fluctuation caused by fading for the first antenna component.

Further, preferably, the present invention provides the mobile station apparatus wherein the second channel compensation section multiplies a complex conjugate of the inferred value calculated by the second channel inference section by a data symbol of a received common pilot channel output by the common pilot channel despreading section, thereby compensating for a phase fluctuation caused by fading for the second antenna component, as well as compensating for an antenna phase offset.

Moreover, preferably, the present invention provides the mobile station apparatus that communicates with a base station apparatus and receives a closed-loop transmit diversity signal by a first antenna and a second antenna of the base station apparatus, including a wireless section for performing band conversion between a radio frequency band signal and a baseband signal of the signal communicated to and from the base station apparatus; a pass detection section for detecting a pass location of the signal from the base station apparatus; a common pilot channel despreading section for despreading a common pilot channel transmitted from the base station apparatus; a dedicated physical channel despreading section for despreading a dedicated physical channel transmitted from the base station apparatus; a common pilot channel quality measurement section for measuring at each component transmitted from the two transmitting antennas in regard to the common pilot channel, the quality of the component; an antenna phase difference detection section for detecting a phase difference in the components transmitted from the two transmitting antennas in regard to the common pilot channel; a feedback information generation section for generating, based on the phase difference, feedback information instructing the base station apparatus on a phase rotation of the signal component from the second antenna on the dedicated physical channel; an antenna verification section for determining a weight vector added to the signal of the dedicated physical channel transmitted from the second antenna according to the feedback information; a first channel inference section for inferring the channel of the signal transmission line for a component from the first antenna; a second channel inference section for inferring the channel of the signal transmission line for a component from the second antenna; a first channel compensation section for performing channel compensation for the dedicated physical channel using the result of the channel inference for the component from the first antenna; a second channel compensation section for performing channel compensation for the dedicated physical channel using the result of the channel inference for the component from the second antenna; a first RAKE synthesis section for performing a RAKE synthesis on the signal resulting from the channel compensation by the first channel compensation section; a second RAKE synthesis section for performing a RAKE synthesis on the signal resulting from the channel compensation by the second channel compensation section; an antenna combination section for combining the output from the first RAKE synthesis section and the output from the second RAKE synthesis section; and a closed-loop transmit diversity control section wherein, regarding a common pilot channel transmitted from the base station apparatus, at each component transmitted from two transmitting antennas of the base station apparatus, the quality of the component is measured, and based on the measurement result, channel compensation is performed with the channel inference vector of the antenna component on the side determined to be of bad quality set as the null vector so as not to allow contribution to the combination, to which end, among the two transmitting antennas of the base station, when the quality of the second antenna component is determined to be bad, the antenna phase information detected at the mobile station is not used, the immediately preceding feedback information transmitted to the base station apparatus continues to be used and the verification processing is not performed, and when the quality of the first antenna component is determined to be bad, feedback information is generated with a specific fixed pattern, and the antenna verification section is operated assuming that weight control with no error is also exerted on the base station apparatus side with a specific fixed pattern. Therefore, there is an effect that a diversity effect can be obtained and an increase in noise can be prevented even if an antenna phase difference containing an error is detected. In addition, there is another effect that the processing can be simplified.

The present invention is suitable for a mobile station apparatus capable of obtaining a diversity effect and preventing an increase in noise even if an antenna phase difference containing an error is detected.

What is claimed is:

1. A mobile station apparatus that communicates with a base station apparatus and receives a closed-loop transmit diversity signal by a first antenna and a second antenna of the base station apparatus, the apparatus comprising:
    a wireless section for performing band conversion between a radio frequency band signal and a baseband signal of the signal communicated to and from the base station apparatus;
    a pass detection section for detecting a pass location of the signal from the base station apparatus;
    a common pilot channel despreading section for despreading a common pilot channel transmitted from the base station apparatus;
    a dedicated physical channel despreading section for despreading a dedicated physical channel transmitted from the base station apparatus;
    a common pilot channel quality measurement section for measuring at each component transmitted from the two transmitting antennas in regard to the common pilot channel, the quality of the component;
    an antenna phase difference detection section for detecting a phase difference in the components transmitted from the two transmitting antennas in regard to the common pilot channel;
    a feedback information generation section for generating, based on the phase difference, feedback information instructing the base station apparatus on a phase rotation of the signal component from the second antenna on the dedicated physical channel;
    an antenna verification section for determining a weight vector added to the signal of the dedicated physical channel transmitted from the second antenna according to the feedback information;
    a first channel inference section for inferring the channel of the signal transmission line for a component from the first antenna;
    a second channel inference section for inferring the channel of the signal transmission line for a component from the second antenna;
    a first channel compensation section for performing channel compensation for the dedicated physical channel using the result of the channel inference for the component from the first antenna;
    a second channel compensation section for performing channel compensation for the dedicated physical channel using the result of the channel inference for the component from the second antenna;
    a first RAKE synthesis section for performing a RAKE synthesis on the signal resulting from the channel compensation by the first channel compensation section;
    a second RAKE synthesis section for performing a RAKE synthesis on the signal resulting from the channel compensation by the second channel compensation section;
    an antenna combination section for combining the output from the first RAKE synthesis section and the output from the second RAKE synthesis section; and
    a closed-loop transmit diversity control section for exerting, when the quality of the component from the second antenna is lower than a predetermined quality value based on the quality measured by the common pilot channel quality measurement section, control to cause the feedback information generation section not to use the detection result at the antenna phase difference detection section, and to continue to use the immediately preceding feedback information, control to cause the antenna verification section not to operate, and control to cause the first channel inference section to operate and the second channel inference section not to operate.

2. The mobile station apparatus according to claim 1 wherein the closed-loop transmit diversity control section exerts, when the quality of the component from the first antenna is lower than a predetermined quality value, control to cause the feedback information generation section to use a specific fixed pattern feedback information, the detection result at the antenna phase difference detection section being unused, control to cause the antenna verification section to perform a simplified operation based on the fixed pattern feedback information, and control to cause the first channel inference section not to operate and the second channel inference section to operate.

3. The mobile station apparatus according to claim 2 wherein the antenna verification section operates in the simplified operation assuming that weight control with no error is also exerted on the base station apparatus side with a specific fixed pattern.

4. The mobile station apparatus according to claim 1 wherein the common pilot channel quality measurement section measures the quality of the first antenna component and the quality of the second antenna component, each independently, and regarding the determination of whether the quality as a result of the measurement is good or bad, a predetermined value serves as a threshold value, the quality being determined to be "good" when equal to or higher than the threshold, and the quality being determined to be "bad" when lower than the threshold.

5. The mobile station apparatus according to claim 1 wherein the common pilot channel quality measurement section measures the quality of the first antenna component and the quality of the second antenna component, each independently, and regarding the determination of whether the quality as a result of the measurement is good or bad, if the difference between the quality of the first antenna component and the quality of the second antenna component is equal to or greater than a predetermined value, the antenna component with the lower quality is determined to be "bad".

6. The mobile station apparatus according to claim 1 wherein the first channel compensation section multiplies a complex conjugate of the inferred value calculated by the first channel inference section by a data symbol of a received common pilot channel output by the common pilot channel despreading section, thereby compensating for a phase fluctuation caused by fading for the first antenna component.

7. The mobile station apparatus according to claim 1 wherein the second channel compensation section multiplies a complex conjugate of the inferred value calculated by the second channel inference section by a data symbol of a received common pilot channel output by the common pilot channel despreading section, thereby compensating for a phase fluctuation caused by fading for the second antenna component, as well as compensating for an antenna phase offset.

8. A mobile station apparatus that communicates with a base station apparatus and receives a closed-loop transmit diversity signal by a first antenna and a second antenna of the base station apparatus, the apparatus comprising:
   a wireless section for performing band conversion between a radio frequency band signal and a baseband signal of the signal communicated to and from the base station apparatus;
   a pass detection section for detecting a pass location of the signal from the base station apparatus;
   a common pilot channel despreading section for despreading a common pilot channel transmitted from the base station apparatus;
   a dedicated physical channel despreading section for despreading a dedicated physical channel transmitted from the base station apparatus;
   a common pilot channel quality measurement section for measuring at each component transmitted from the two transmitting antennas in regard to the common pilot channel, the quality of the component;
   an antenna phase difference detection section for detecting a phase difference in the components transmitted from the two transmitting antennas in regard to the common pilot channel;
   a feedback information generation section for generating, based on the phase difference, feedback information instructing the base station apparatus on a phase rotation of the signal component from the second antenna on the dedicated physical channel;
   an antenna verification section for determining a weight vector added to the signal of the dedicated physical channel transmitted from the second antenna according to the feedback information;
   a first channel inference section for inferring the channel of the signal transmission line for a component from the first antenna;
   a second channel inference section for inferring the channel of the signal transmission line for a component from the second antenna;
   a first channel compensation section for performing channel compensation for the dedicated physical channel using the result of the channel inference for the component from the first antenna;
   a second channel compensation section for performing channel compensation for the dedicated physical channel using the result of the channel inference for the component from the second antenna;
   a first RAKE synthesis section for performing a RAKE synthesis on the signal resulting from the channel compensation by the first channel compensation section;
   a second RAKE synthesis section for performing a RAKE synthesis on the signal resulting from the channel compensation by the second channel compensation section;
   an antenna combination section for combining the output from the first RAKE synthesis section and the output from the second RAKE synthesis section; and
   a closed-loop transmit diversity control section wherein, regarding a common pilot channel transmitted from the base station apparatus, at each component transmitted from two transmitting antennas of the base station apparatus, the quality of the component is measured, and based on the measurement result, channel compensation is performed with the channel inference vector of the antenna component on the side determined to be of bad quality set as the null vector so as not to allow contribution to the combination, to which end, among the two transmitting antennas of the base station, when the quality of the second antenna component is determined to be bad, the antenna phase information detected at the mobile station is not used, the immediately preceding feedback information transmitted to the base station apparatus continues to be used and the verification processing is not performed, and when the quality of the first antenna component is determined to be bad, feedback information is generated with a specific fixed pattern, and the antenna verification section is operated assuming that weight control with no error is also exerted on the base station apparatus side with a specific fixed pattern.

* * * * *